Aug. 14, 1928.

H. STRANSKY 1,680,397

ELECTRIC STEAM BOILER

Filed April 23, 1926    2 Sheets-Sheet 1

WITNESSES:

INVENTOR
Hans Stransky
BY
ATTORNEY

Aug. 14, 1928. 1,680,397
H. STRANSKY
ELECTRIC STEAM BOILER
Filed April 23, 1926 2 Sheets-Sheet 2
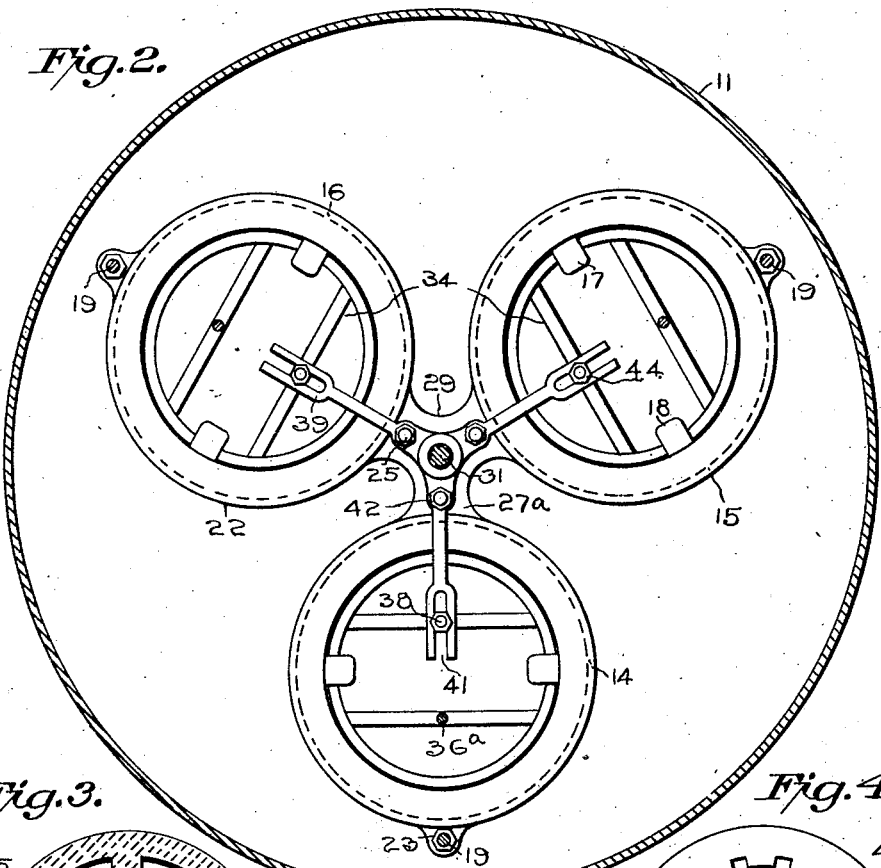
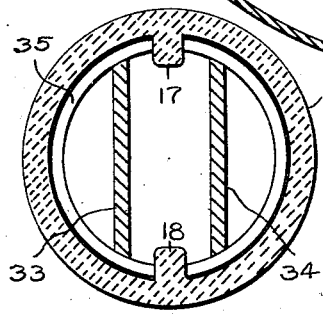
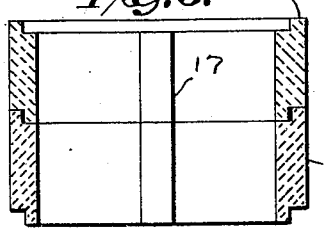
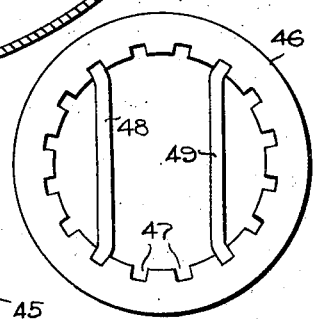
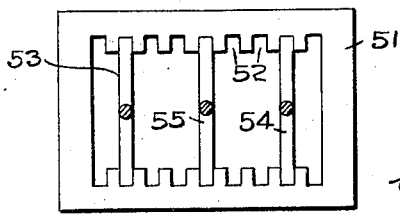
WITNESSES:
R. S. Harrison
H. M. Biebel
INVENTOR
Hans Stransky.
BY
ATTORNEY Patented Aug. 14, 1928.

1,680,397

UNITED STATES PATENT OFFICE.

HANS STRANSKY, OF VIENNA, AUSTRIA, ASSIGNOR TO WESTINGHOUSE ELECTRIC & MANUFACTURING COMPANY, A CORPORATION OF PENNSYLVANIA.

ELECTRIC STEAM BOILER.

Application filed April 23, 1926, Serial No. 104,090, and in Austria July 7, 1925.

My invention relates to fluid heaters, and particularly to electric steam boilers of the electrode type.

One object of my invention is to provide an electrode construction and arrangement for an electric steam boiler, that shall be relatively simple and efficient in operation, and easily adjusted for varying loads and outputs.

Another object of my invention is to provide an electrode construction that shall permit of varying the distance between cooperating electrodes in accordance with the voltage of a supply circuit.

In practicing my invention, I provide a casing, a plurality of pairs of co-operating plane electrodes symmetrically located in said casing, tubular members of electric-insulating material located around said pairs of electrodes, said tubular members embodying means for holding the electrode in spaced parallel planes and for guiding the movable electrodes as they are simultaneously moved.

In the drawings, Figure 1 is a view, partly in side elevation and partly in vertical section, of the device embodying my invention;

Fig. 2 is a horizontal sectional view taken on the line II—II of Fig. 1;

Fig. 3 is a view in lateral section through a tubular member and the electrodes located therein;

Fig. 4 is a top plan view of a modified form of tubular member and of electrodes therein;

Fig. 5 is a fragmentary view, in vertical section, of a modified form of tubular member, and Fig. 6 is a top plan view of a still further modification of a tubular member and of co-operating electrodes located therein.

Figure 1:
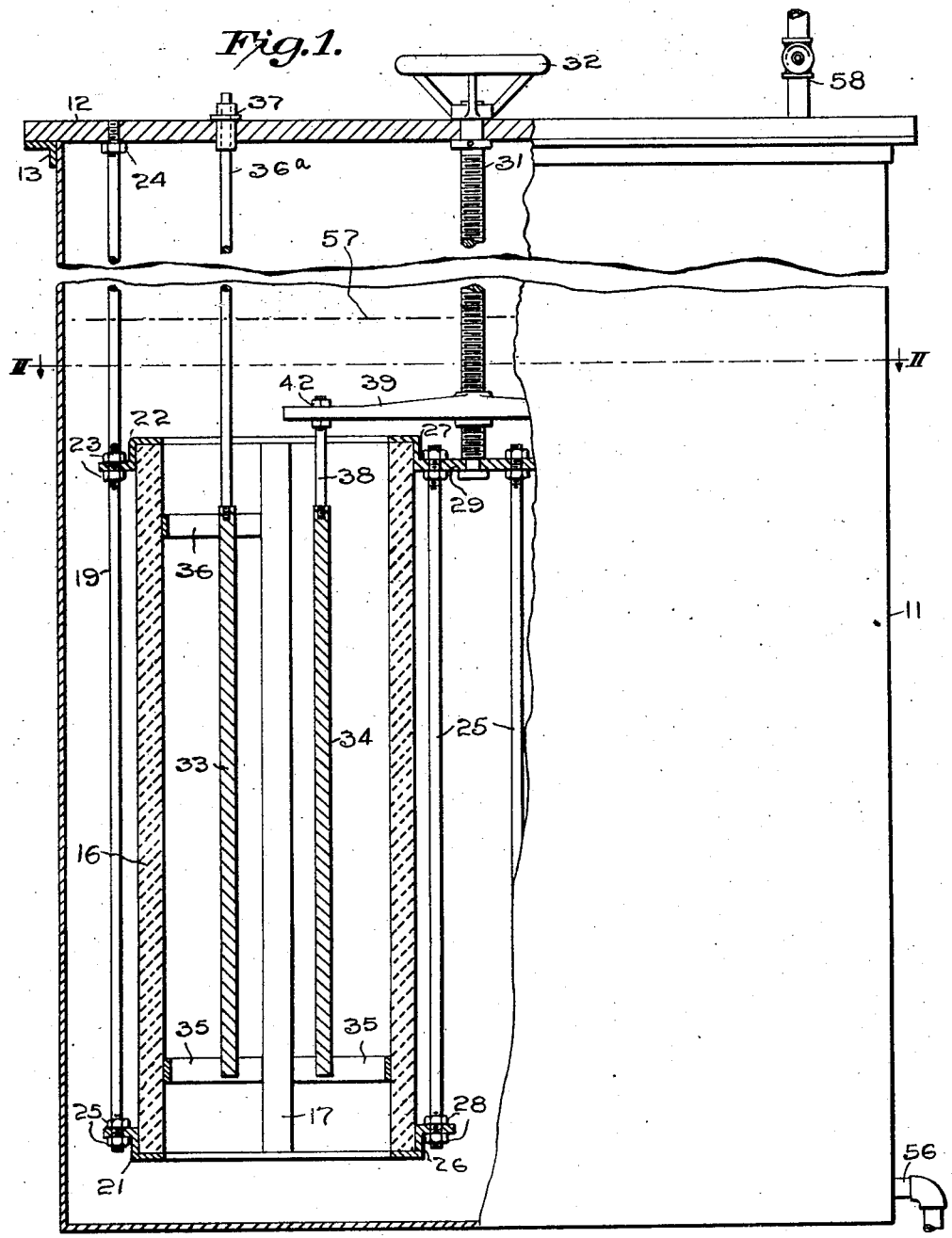

Referring to Figs. 1, 2 and 3, an electric steam boiler comprises a casing 11 that is made of suitable material, such as steel, and that may be of any suitable or desired contour and dimensions in accordance with the output of steam which it is desired to obtain in operation. The casing 11 is here shown as being substantially cylindrical with an integral bottom portion and provided with a cover member 12 which may be suitably secured to the upper portion of the casing or container 11, a reinforcing annular member 13 being provided and preferably welded to the upper edge portion of the casing 11.

A plurality of tubular members 14, 15, and 16 are located within the casing 11 and extend vertically therein and are symmetrically spaced peripherally of the central vertical axis of the casing 11. Each of the tubular members 14 to 16, inclusive, is of suitable electric-insulating ceramic material and may be of the shape illustrated in Fig. 3 of the drawing. As there shown, the outer peripheral surface thereof is smooth and the inner peripheral surface thereof is provided with two longitudinally extending ribs 17 and 18 for a purpose to be hereinafter described in detail. The tubular members 14 to 16, inclusive, are open at both the upper and the lower ends thereof.

Each of the tubular members is supported from the cover member 12 by suitable suspension rods 19, as illustrated more particularly in Fig. 1 of the drawing, clamping members 21, of L-shape, being provided at the lower portion of the tubular members and similar clamping members 22 being provided at the upper ends of the tubular members, which clamping members are secured on the suspension rods 19 by pairs of cooperating nuts 23. The suspension rods 19 may be screwed into suitable threaded openings in the cover member 12 and prevented from turning movement relatively thereto by lock nuts 24.

I have illustrated one of the suspension rods for each of the tubular members 14 to 16, inclusive, located at the outer portion thereof near the inner side of the casing 11. The inner portions of the tubular members may be suitably supported by somewhat shorter clamping rods 25, three of which are provided, and similar clamping members of L-shape 26 and 27, respectively, being provided at the bottom and at the top of the respective tubular members and secured to clamping bolts 25 by cooperating nuts 28. The clamping members 27 may be made integral, as is shown in Figs. 1 and 2 of the drawing, in which case they will constitute a plate 29, having three radially extending arms or portions 27a.

An opening is provided centrally of this member 29 and a reduced shoulder portion of a screw-threaded shaft 31 extends therethrough, the upper end of which extends through a suitable opening in the cover member 12 and has located thereon, above the cover member 12, a hand wheel 32 to permit of effecting a turning or a rotating movement of the screw-threaded shaft 31 for a purpose to be hereinafter set forth in detail.

While I have illustrated and described a specific embodiment of means for supporting a plurality of open-ended insulating tubes, I have done so for illustrative purposes only, as the specific details of construction of the holding means are not particularly important or dominant in the construction embodying the invention.

Cooperating pairs of plane electrodes that are located in each of the open-ended tubular members, comprise a substantially fixed electrode 33, and a movable electrode 34. Each of these electrodes consists preferably of a plane strip of metal of any suitable kind that will withstand the electrolytic action of the current during the operation of the boiler to as great an extent as possible. The substantially fixed electrode 33 is provided adjacent to its upper and lower ends, with substantially semi-annular portions 35 and 36 respectively, the outer ends of which engage one side surface of the ribs 17 and 18 hereinbefore described as being integral with the tubular members. Any suitable or desired method of connecting members 35 and 36 to the electrode 33 may be employed.

The electrode 33 is suspended within the tubular member by means of a suspension rod 36a extending through the cover member 12, an insulating bushing 37 being located therebetween to properly insulate the electric-conducting rod 36 from the cover member. The rod member 36a not only supports the weight of the electrode 33 and of the portions 35 and 36 secured thereto, but also conducts current thereto when the outer end of the rod 36a is connected to a suitable source of supply of electric energy (not shown).

The inner electrode 34 is of substantially the same construction as hereinbefore described for the electrode 32, except that its upper end is not provided with the spacing and guiding member 36. The lower end of the member 34 is provided with a member 35 which holds the lower end portion of the electrode in its proper operative and spaced position within the tubular member. The upper end portion of the electrode 34 is provided with a short rod member 38, the upper end of which is secured to a supporting member 39 having three arms which are provided respectively with longitudinally extending slots 41 therein, as is shown more particularly in Fig. 2 of the drawing. Cooperating nuts 42 serve to secure the upper end of the rod 38 to the arm of the member 39. The member 39 is provided with a central screw-threaded opening through which the screw-threaded shaft 31 extends, as is shown more particularly in Fig. 1 of the drawing.

It may be noted that a turning movement imparted to the hand wheel 32 will cause movement of the member 39 and of the plurality of electrodes 34 secured thereto in either an upwardly or a downwardly vertical direction. If found necessary, other means for preventing turning or twisting movement of the member 39 may be provided, but are not considered necessary if the other portions of the electrode structure are sufficiently rigid.

Fig. 4 of the drawing illustrates a modified form of tubular member and of co-operating plane electrodes. The tubular member 46 may be made in either one piece, as shown in Fig. 1 of the drawing, or in a plurality of interfitting sections, as shown in Fig. 5, and, in either case, is provided with a plurality of symmetrically spaced inner axially-extending grooves 47. Co-operating electrodes 48 and 49 are of substantially plane form but have their side portions bent to such an extent that they will fit into two opposed and symmetrically located slots or grooves 47 substantially as shown in Fig. 4 of the drawing. I have there illustrated an intermediate position for the two co-operating electrodes, as it is evident that, if the electrodes are made narrower, they will fit into two grooves located somewhat closer together, and that the two electrodes will be located a greater distance apart but still in parallel planes. If it is desired to reduce the distance between the electrodes laterally thereof, I can employ wider electrodes which will fit into pairs of grooves 47 that are located almost diametrally of the tubular member, thus reducing the distance between the two parallel planes of the electrodes.

Fig. 5 of the drawing illustrates a modified form of construction of the tubular members in that a plurality of interfitting sections 45 are provided instead of a single member. This may be desirable in order to reduce the cost of construction of the tubular members of electrical-insulating material, and also to reduce the loss in case one of these tubular members were to be damaged. These sections are provided with co-operating shoulder portions which interfit, substantially as shown in Fig. 5 of the drawing, and are also provided with integral axially-extending ribs 17, the same as was hereinbefore described in connection with Fig. 3 of the drawing.

Fig. 6 of the drawing illustrates another modification in which a tubular member 51 of substantially rectangular shape in lateral section is provided. The two inner side walls are provided with slots 52 which serve the same purpose as was hereinbefore described in connection with those shown in member 46 in Fig. 4.

If I desire to use the tubular member 51 for energization from a source of supply of relatively high voltage, I may employ a single substantially fixed, plane electrode 53 located near one end portion of the tubular member 51 and a second co-operating movable electrode 54 at the opposite side or end of the interior of the tubular member. It will be evident that the distance through which the current must traverse the fluid contained in the casing when flowing from electrode 53 to electrode 54 is relatively large, and the resistance of this path will also be relatively large.

However, if I desire to employ this kind of insulating tubular member on somewhat lower voltages and desire to obtain a relatively large input of electric energy, electrodes 53 and 54 may be suitably electrically connected, by means not shown, and an intermediate movable co-operating electrode 55 may be employed. It is obvious that the plurality of grooves in the inner side walls of the member 51 will permit of varying the distance between cooperating electrodes within relatively wide limits, in order to permit of adapting them to various voltages.

In operation of the boiler of Figs. 1, 2 and 3, water may be permitted to enter through an inlet 56 located at any suitable position on the casing 11 and the water level may be maintained at the line indicated by 57 in Fig. 1 of the drawing. I have shown three tubular members and co-operating pairs of electrodes for connection to a three-phase source of supply of electric energy, the three phases being connected respectively to the three terminal rods and suspension members 36. The inner electrodes 34 are electrically connected together by means of the supporting and actuating member 39. They will constitute a neutral point and, as they are also electrically connected to the casing through the rod or shaft 31, the casing will also constitute a neutral point of the system and may, therefore, be grounded, as is usual in the art.

Current will, therefore, flow from the respective terminal members 36 to the electrodes 33 and from there to the cooperating inner electrodes 34 in a manner well known in the art, traversing the fluid which is located within the respective open-ended tubular members. Steam will, therefore, be generated and will rise upwardly into the open space above the water line and may be drawn off through a suitable outlet or conduit 58.

The positions of the two electrodes, shown in Fig. 1 of the drawing, when they are co-extensive is the one in which the greatest amount of energy will be taken from a source of supply and translated into heat and thereby into steam. If we desire to reduce the input for purposes of regulation, the hand wheel 32 may be turned in such direction as to raise the movable electrodes 34 simultaneously in a vertically upward direction.

In the construction illustrated in Figs. 1, 2 and 3, the member 35 will guide the lower portion of the movable electrode and permit it to move in a longitudinal plane vertically upward. By reason of the fact that, after such movement, the two electrodes are no longer co-extensive, the area of cross-section of the fluid path between the cooperating electrodes is less than before and this will reduce the energy input. When the movable electrodes have been moved to such an extent that they project above the water level in the boiler, they will effect a decrease in the area of submerged electrode, which also results in an increase in the ohmic resistance and, therefore, in a reduction in the amount of current traversing the circuit.

If the modified forms of construction shown in Figs. 4 and 6 is employed, substantially the same guiding effect is obtained on the part of the inwardly slotted tubular member and the cooperating electrodes having portions fitting within the slots.

The device embodying my invention thus provides a relatively simple electrode support and actuating structure, the actuating means being effective to move all of the movable electrodes simultaneously so that substantial balanced conditions of load may be maintained. It may be further noted that the tubular members and co-operating electrodes located therein are symmetrically spaced relatively to each other and to the casing, in order to insure that the load on the three phases will be substantially uniform.

While I have illustrated a three-phase arrangement, it is, of course, obvious that any desired number of phases may be provided by using the proper number of symmetrically spaced tubular members and of co-operating pairs of electrodes located therein.

Various modifications may be made in the invention without departing from the spirit and scope thereof, and I desire, therefore, that only such limitations shall be imposed as are imposed by the prior art.

I claim as my invention:

1. In an electrode steam boiler, in combination, a fixed tubular member of insulating material having an open top and bottom, a pair of co-operating spaced electrodes in said tubular member, means embodied in said tubular member for holding one of said electrodes in a predetermined position therein, and means embodied in said tubular member for holding the second electrode in predetermined spaced relation to said first electrode and for permitting it to be moved longitudinally of its length.

2. In an electrode steam boiler, in combination, a tubular electric-insulating member, and a pair of co-operating spaced plane electrodes in said member, said member embodying means for permitting of varying the distance between the electrodes laterally of their planes in accordance with the voltage of an energizing circuit.

3. In an electrode steam boiler, in combination, a pair of cooperating spaced plane electrodes, a tubular insulating member surrounding said electrodes and embodying means for permitting of varying the distance between said electrodes laterally of the plane thereof and for guiding one of said electrodes when moved longitudinally of the plane thereof.

4. In an electrode steam boiler, in combination, a casing, a plurality of tubular members of electric-insulating material in said casing, an electrode in each of said tubular members, a second electrode in each of said tubular members, spaced laterally from the first named electrode therein, and means for moving all of said second electrodes simultaneously.

5. In an electrode steam boiler, in combination, a casing, a plurality of tubular members of electric-insulating material in said casing, an electrode in each of said tubular members, a second electrode in each of said tubular members, spaced laterally from the first named electrode therein, and means for moving all of said second electrodes simultaneously while maintaining a predetermined distance between the planes of said co-operating electrodes.

6. In an electrode steam boiler, in combination, a casing, a plurality of tubular members of electric-insulating material in said casing, an electrode in each of said tubular members, a second electrode in each of said tubular members, spaced laterally from the first named electrode therein, means for moving all of said second electrodes simultaneously, and means embodied in said tubular members for guiding said movable electrodes.

7. In an electrode steam boiler, the combination with a closed casing, of a plurality of fixed tubular insulating members in the casing, a plane electrode in each of said tubular members, a second plane electrode in each of said tubular members, means for moving all of said second electrodes simultaneously, and means embodied in the respective tubular members for maintaining a predetermined distance between the planes of the co-operating electrodes in each tubular member.

8. In an electrode steam boiler, the combination with a closed casing, of a plurality of fixed tubular insulating members in the casing, a plane electrode in each of said tubular members, a second plane electrode in each of said tubular members, means for moving all of said second electrodes simultaneously, and means embodied in the respective tubular members for maintaining a predetermined distance between the planes of the cooperating electrodes in each tubular member and for guiding the movable electrode therein.

In testimony whereof, I have hereunto subscribed my name this twenty-third day of March, 1926.

HANS STRANSKY.